2,737,811
RETARD PRESSURE GAUGE

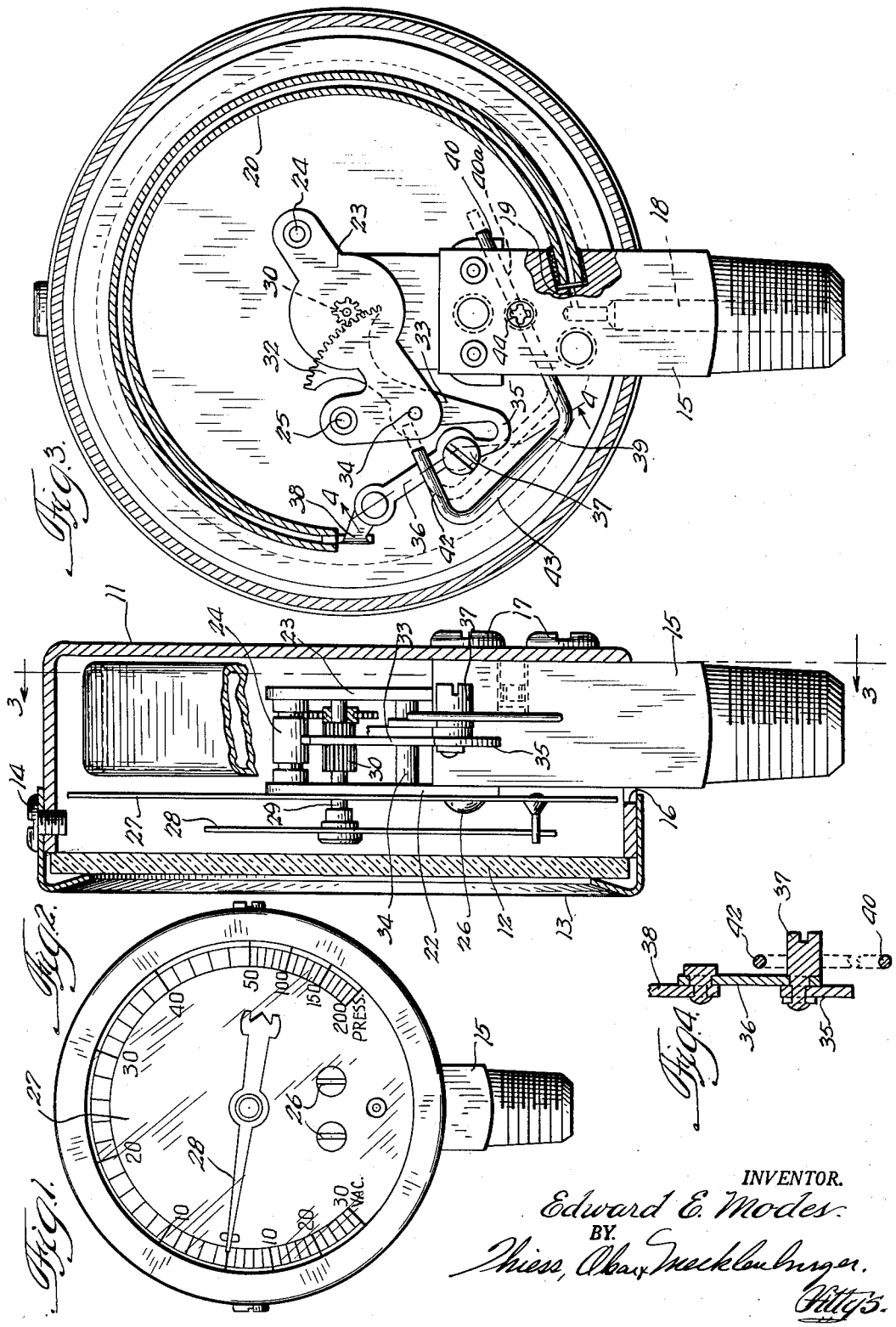

Edward E. Modes, Chicago, Ill., assignor to Jas. P. Marsh Corporation, Skokie, Ill., a corporation of Illinois Application February 29, 1952, Serial No. 274,267

5 Claims. (Cl. 73—397)

The present invention relates to gauges and has special reference to retard gauges in which mechanism is employed to retard the movement of the gauge mechanism whenever the normal operating range of the gauge is exceeded.

More particularly this invention relates to a retard gauge having provision for controlling the exact point at which the retard mechanism comes into operation, and also for easily and accurately adjusting the retard mechanism to increase or decrease its retarding force or effect.

In a vacuum and pressure gauge such as that illustrated, the normal pressure range may be from 0 to 50 pounds. When the pressure exceeds 50 pounds, the mechanism is retarded so that the indicator moves a relatively small distance while indicating a relatively large change in pressure.

An object of the present invention is to provide a retard gauge having means for readily and accurately adjusting the retard range of the gauge.

Another object is to provide a retard gauge which may be quickly adjusted to control the exact point at which the retard mechanism comes into operation.

Further objects and advantages will be apparent from the following description and claims when considered with the accompanying drawings, in which Fig. 1 is a front elevational view of a gauge embodying the present invention;

Fig. 2 is a side elevational view partly in section of the gauge shown in Fig. 1, with certain portions broken away;

Fig. 3 is a cross-sectional view taken on the line 3—3 of Fig. 2; and

Fig. 4 is a cross-sectional view taken on the line 4—4 of Fig. 3.

Referring more particularly to the drawings, there is shown a retard gauge embodying the present invention. The gauge illustrated is of the compound type for indicating both pressure and vacuum, and comprises a dished casing 11 having the usual cover glass 12 on the front thereof held in position by any suitable means, such as a mounting ring 13. Screws 14 may be employed for maintaining the mounting ring 13 in proper position. A post or socket 15 which may have its lower end threaded for connection to a container extends through an opening 16 provided therefor in the bottom side of the casing 11. The post may be rectangular in cross-section and the casing may be secured to the rear side thereof by screws 17. The post has the usual central passageway 18 therein communicating with a slot 19 into which one end of the Bourdon tube 20 may be braised or otherwise secured so that the passageway 18 communicates with the interior of the Bourdon tube.

The indicating mechanism is mounted on a frame comprising front and rear supporting plates 22 and 23, respectively, held in parallel spaced relation by columns 24 and 25. The lower end of the front plate 22 extends below the rear plate 23 and is secured to the front side of the post 15 by screws 26. Thus, in the construction shown, the entire mechanism and casing are supported on the post 18.

An indicating dial 27 fits over the front of the front plate 22, being maintained in position by the screws 26, which also pass therethrough. A pointer 28 is mounted on the front end of a shaft 29, rotatably mounted in the plates 22 and 23 and extending forwardly of the front plate. Fixed on the shaft 29 is a pinion 30 which meshes with a gear segment 32 formed at one end of a lever 33, the latter being fixed to an arbor 34 pivotally mounted between the front and rear plates 22 and 23. The opposite end of the lever is formed with a gooseneck 35 which is pivotally connected to one end of a link 36 by the shank end of an eccentric 37. The opposite end of the link 36 is pivotally connected to the end piece 38 on the outer free end of the Bourdon tube 20. The eccentric 37 is riveted friction-tight, to the end 35 of the lever 33 and is provided with a slotted head whereby it may be rotated with a screw driver and will remain fixed against external displacement after movement.

The retard mechanism may comprise a spring member 39 which is preferably substantially J-shaped, as shown in Fig. 3. In this form there is a relatively long leg 40 and a relatively short leg 42, the two being joined by a connecting member 43. It has been found desirable to have the legs 40 and 42 substantially parallel as illustrated.

In the pressure gauge shown in the drawings, the retard spring 39 is arranged with the long leg 40 slidably mounted in a slot 40a provided therefor in the post 18 and with the short leg 42 positioned on the far side of the eccentric 37.

The retard spring is initially shaped so that the short leg 42 will be engaged by the eccentric 37 when the Bourdon tube has been moved through its normal pressure range, such as the 50 pounds shown on the gauge indicated. By rotating the eccentric 37, this point may be exactly controlled so that as soon as the gauge exceeds 50 pounds the eccentric will be limited in its movement by the retard spring 37.

The retard portion of the gauge may also be accurately adjusted by longitudinally moving the leg 40 of the retard spring 39 longitudinally thereof in the post 18. As the hooked end of the spring is moved outwardly, the distance along the spring from the point contacted by the eccentric to the point that the spring enters the post will be increased. The effect of this is to decrease the resistance exerted by this spring against movement of the eccentric and the free end of the Bourdon tube. On the other hand, when the spring is moved in the opposite direction, the distance along the spring from the point that it enters the post to the point that it is engaged by the eccentric will be decreased and the spring will be stiffened, thereby increasing the retarding effect of the spring on the eccentric and the free end of the Bourdon tube.

With the legs 42 and 40 parallel, the leg 40 of the retard spring 39 may be moved longitudinally in the post 18 to increase or decrease its retarding effect without varying the adjustment of the eccentric 37. Moreover, rotation of the eccentric 37 will not substantially affect the retarding effect of the spring 39. Another advantage of employing a J-shaped retard spring, as illustrated, is that it requires less space than most other forms thereby enabling it to fit into a casing of the size commonly employed with similar Bourdon tubes.

The shape of the spring may be changed so long as one end may be moved generally longitudinally in the post 18 or other supporting structure, and the opposite free end of the spring will be engaged by the eccentric or other projection when the Bourdon tube has moved through its normal operating range. However, unless that portion of the shorter leg 42 which is intended to be engaged by the eccentric is straight and parallel to the longer leg 40, adjustment of the retard spring in the post will also require adjustment of the eccentric 37.

A retard construction embodying the present invention may also be employed in connection with other types of pressure responsive devices than the Bourdon tube shown in the drawings. In this case the actuating mechanism for transmitting the movement of the pressure responsive means to the indicator would also have to be changed. The retard spring construction shown, could be employed satisfactorily in such other type of device.

After a gauge, such as that shown, is assembled, the eccentric 37 is first adjusted to control the point at which the retard construction will become operative. Thereafter, the position of the long leg 40 in the post may be varied until the retard portion of the gauge is accurate. The leg 40 is then secured in proper position by the headless set screw 44.

While I have shown and described a particular embodiment of the present invention, it is manifest that various changes and modifications may be made therein without departing from the invention and therefore I wish this to be limited only by the prior art and the appended claims.

I claim:

1. In a retard gauge construction having an indicator, actuating mechanism comprising a Bourdon tube and transmission means movable by said Bourdon tube for actuating said indicator, and a post having a passageway therein connected to said Bourdon tube, a retard construction comprising a substantially J-shaped resilient member with the legs thereof substantially parallel and straight, the relatively long leg of said resilient member being adjustably mounted on said post for movement longitudinally of said leg, and said relatively short leg being positioned in and generally transversely of the path of movement of a portion of said actuating mechanism for being engaged thereby when said portion has moved a predetermined distance to retard further movement thereof, the mounting of said leg on said post being such that movement of said resilient member varies the distance along said resilient member from said support to the point of contact by said actuating mechanism portion substantially without varying the distance between said actuating mechanism portion and said relatively short leg.

2. If a retard gauge construction having an indicator, actuating mechanism comprising a Bourdon tube and transmission mean movable by said Bourdon tube for actuating said indicator, and a post having a passageway therein connected to said Bourdon tube, a retard construction comprising a resilient member having a pair of parallel substantially straight spaced leg portions and a connecting member connecting ends of said leg portions, said post having an opening therein for slidably receiving one of said leg portions to permit movement of said resilient member generally longitudinally of said leg portion, and said second leg portion being positioned in and substantially transversely of the path of movement of a portion of said actuating mechanism for being engaged thereby when said portion has moved a predetermined distance to retard further movement thereof, the opening in said post extending in a direction substantially transversely of the path of movement of said actuating mechanism portion, whereby movement of said resilient member in said post may vary the distance along said resilient member from said support to the point of contact by said actuating mechanism portion substantially without varying the distance between said actuating mechanism portion and said second leg portion.

3. In a retard gauge construction having an indicator, actuating mechanism comprising a pressure responsive element and transmission means movable by said pressure responsive element for actuating said indicator, and a supporting structure, a retard construction comprising an eccentrically mounted contact member on said actuating mechanism, a resilient member having a pair of spaced substantially straight parallel leg portions and a connecting member connecting corresponding ends of said legs, one of said legs being adjustably mounted on said supporting structure for movement generally longitudinally of said leg portion, and said second leg portion being positioned in the path of movement of said contact member for being engaged thereby when said portion has moved a predetermined distance to retard further movement thereof, said contact member being adjustable toward and away from the leg portion adjacent thereto, the mounting of said leg portion on said supporting structure being such that movement of said resilient member varies the distance along said resilient member from said support to the point of contact by said contact member substantially without varying the distance between said contact member and said second leg portion.

4. In a retard gauge construction having an indicator, actuating mechanism comprising a pressure responsive element and transmission means movable by responsive element for actuating said indicator, and a supporting structure, a retard construction comprising a resilient member having a pair of spaced leg portions extending in the same general direction and a connecting member connecting ends of said leg portions, one of said leg portions being movably mounted on said supporting structure with said second leg portion positioned in and substantially transversely of the path of movement of a portion of said actuating mechanism for being engaged thereby when said portion has moved a predetermined distance along its path of movement to retard further movement thereof, and guide means associated with said supporting structure and constraining the first said leg portion to a path of movement such that the said second leg portion moves in a path lying substantially longitudinally of the length of the said second leg portion when the first said leg portion is moved, whereby movement of said first leg in said guide means varies the distance along said resilient member from said guide means to the path of movement of said actuating mechanism portion without varying the distance along said path between said actuating mechanism portion and said second leg.

5. In a retard gauge construction having an indicator, actuating mechanism comprising a pressure responsive element and transmission means movable by responsive element for actuating said indicator, and a supporting structure, a retard construction comprising a resilient member having a pair of substantially straight parallel leg portions and a connecting member connecting ends of said leg portions, one of said leg portions being movably mounted on said supporting structure with said second leg portion positioned in and substantially transversely of the path of movement of a portion of said actuating mechanism for being engaged thereby when said portion has moved a predetermined distance along its path of movement to retard further movement thereof, and guide means associated with said supporting structure and constraining the first said leg portion to a path of movement substantially longitudinal of itself when it is moved, whereby movement of said first leg in said guide means varies the distance along said resilient member from said guide means to the path of movement of said actuating mechanism portion without varying the distance along said path between said actuating mechanism portion and said second leg.

References Cited in the file of this patent

UNITED STATES PATENTS

| | | |
|---|---|---|
| 1,324,988 | Thompson | Dec. 16, 1919 |
| 1,414,165 | Aschenbach | Apr. 25, 1922 |
| 1,565,445 | Heise | Dec. 15, 1925 |
| 1,565,446 | Heise | Dec. 15, 1925 |
| 1,569,749 | Heise | Jan. 12, 1926 |
| 2,483,237 | Rose | Sept. 27, 1949 |